United States Patent
Kwok et al.

(10) Patent No.: US 9,473,184 B1
(45) Date of Patent: Oct. 18, 2016

(54) TRANSMIT-RECEIVE CIRCUITRY AND ELECTRONIC WIRELESS DEVICE

(71) Applicant: QUALCOMM Technologies International, Ltd., Cambridge (GB)

(72) Inventors: Terence Chi-Fung Kwok, London (GB); Vasileios Mylonakis, Cambridge (GB)

(73) Assignee: QUALCOMM TECHNOLOGIES INTERNATIONAL, LTD., Cambridge (GB)

( * ) Notice: Subject to any disclaimer, the term of this patent is extended or adjusted under 35 U.S.C. 154(b) by 0 days.

(21) Appl. No.: 14/799,967

(22) Filed: Jul. 15, 2015

(51) Int. Cl.
  *H04B 1/44* (2006.01)
  *H04B 1/40* (2015.01)
  *H04B 1/10* (2006.01)

(52) U.S. Cl.
  CPC .............. *H04B 1/1027* (2013.01); *H04B 1/40* (2013.01); *H04B 2001/1045* (2013.01)

(58) Field of Classification Search
  CPC ............ H04B 1/04; H04B 1/16; H04B 1/38; H04B 1/40; H04B 1/44; H04B 1/48; H04B 1/401; H04B 1/581; H04B 5/0037; H04B 5/0093; H03F 2200/294; H03F 2200/451; H03F 2200/534; H03F 2200/537; H03F 2200/541; H01Q 1/50
  USPC ................ 455/73, 78, 80, 82, 83, 232.1, 84; 330/286, 297; 343/850, 859, 860
  See application file for complete search history.

(56) References Cited

U.S. PATENT DOCUMENTS

| | | | | |
|---|---|---|---|---|
| 6,919,858 B2 * | 7/2005 | Rofougaran | ............. | H04B 1/18 343/850 |
| 7,129,803 B2 * | 10/2006 | Khorram | .................. | H03H 7/42 333/177 |
| 7,269,391 B2 * | 9/2007 | Chiu | ........................ | H03H 7/42 455/83 |
| 7,683,851 B2 * | 3/2010 | Rofougaran | ............ | H03F 3/211 343/850 |
| 8,489,035 B2 * | 7/2013 | Chiang | ..................... | H03F 3/24 455/232.1 |
| 9,031,517 B2 * | 5/2015 | Jerng | .................... | H04B 1/0458 455/78 |

* cited by examiner

*Primary Examiner* — Quochien B Vuong
(74) *Attorney, Agent, or Firm* — Procopio, Cory, Hargreaves & Savitch LLP

(57) ABSTRACT

Transmit-receive circuitry for an electronic device capable of wireless communication includes: an antenna input/output, for coupling to an antenna; a transmit path, coupled to the antenna input/output, the transmit path including: a power amplifier, for receiving a transmission signal to be transmitted via the antenna; and a transformer; and a receive path, coupled to the antenna input/output, the receive path including: a low noise amplifier, for receiving a reception signal from the antenna. In a receive mode, the low noise amplifier is configured to receive reception signals via the antenna input/output, and the transmit path is connected to the antenna input/output such that the reception signals experience gain as a result of the transformer in the transmit path.

23 Claims, 3 Drawing Sheets

TRANSMIT-RECEIVE CIRCUITRY AND ELECTRONIC WIRELESS DEVICE

TECHNICAL FIELD

The present invention relates to electronic circuits and methods, and particularly to transmit-receive circuitry for an electronic device capable of wireless communication.

BACKGROUND

Modern wireless communication requires the ability to receive signals over a wide range of frequencies. Accordingly, transmit-receive circuits for modern wireless communication devices have two functions: amplifying signals to be transmitted via one or more antennas; and amplifying smaller signals. This dual requirement causes a problem as the transmitted signals will typically be associated with high power, while the received signals will have a low power, requiring sensitive electronics to amplify and distinguish the useful signal from the background noise.

The conventional approach to this problem is to provide separate transmit and receive paths within the circuit, and a switch located off-chip to decouple the paths from each other. This prevents interference, and also isolates the high-power transmitted signals from the sensitive electronics in the receive path. When seeking to improve receiver performance, particularly to increase the range of frequencies over which the receiver is effective, improvements are made to the receive path in isolation from the transmit path. However, this has the drawback of increasing the physical size of the transmit-receive circuit.

SUMMARY OF INVENTION

According to an aspect of the present invention, there is provided transmit-receive circuitry for an electronic device capable of wireless communication, the circuitry comprising: an antenna input/output, for coupling to an antenna; a transmit path, coupled to the antenna input/output, the transmit path comprising: a power amplifier, for receiving a transmission signal to be transmitted via the antenna; and a transformer; and a receive path, coupled to the antenna input/output, the receive path comprising: a low noise amplifier, for receiving a reception signal from the antenna.

In a receive mode, the low noise amplifier is configured to receive reception signals via the antenna input/output, and the transmit path is connected to the antenna input/output such that the reception signals experience gain as a result of the transformer in the transmit path.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION

Figure 1:
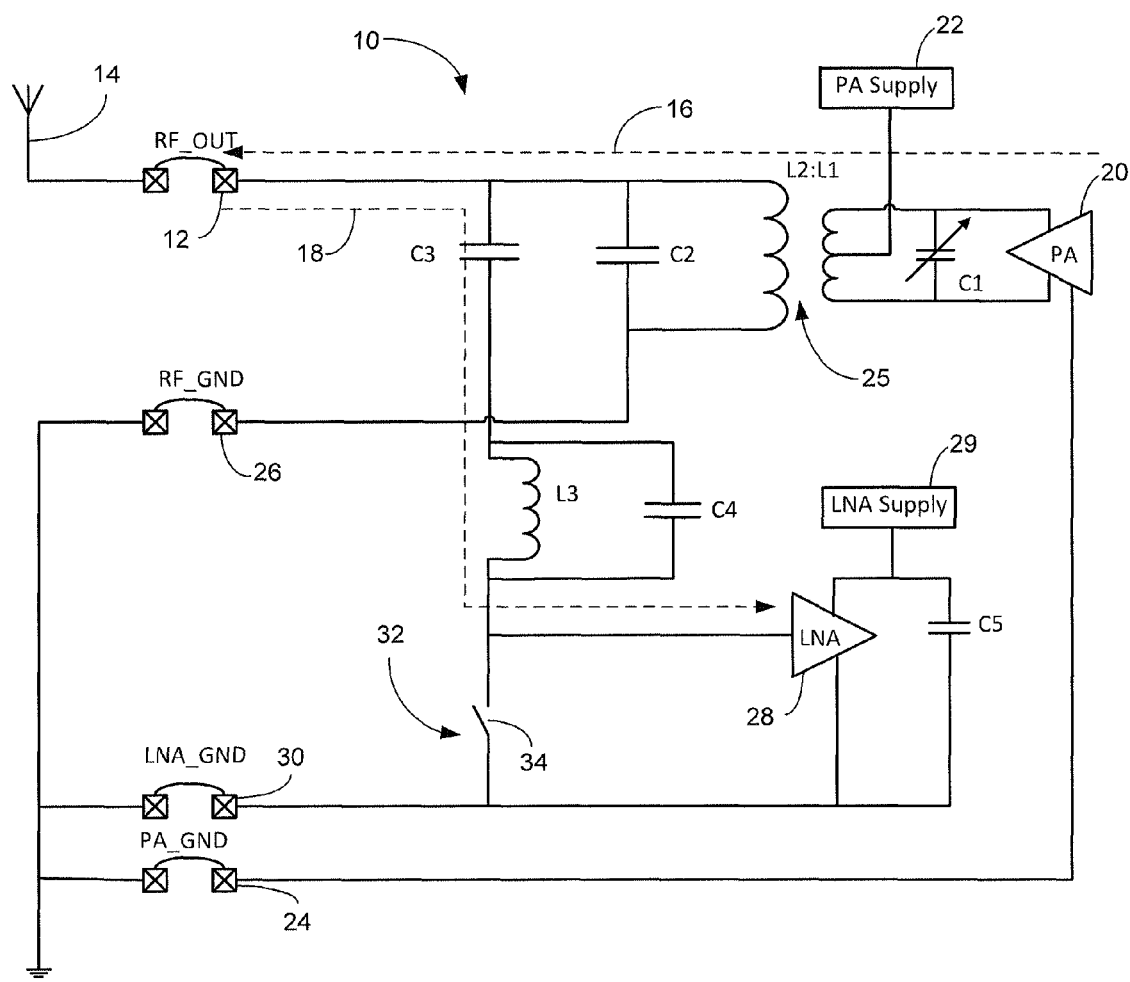
FIG. 1 shows transmit-receive circuitry according to embodiments of the invention.

FIG. 1 shows transmit-receive circuitry 10 according to embodiments of the invention, and its connection to various components such as a ground rail and an antenna. In an embodiment, the circuitry 10 is provided on a single chip. The circuitry comprises an antenna input/output connection pad 12 for connection to an antenna 14 which in the illustrated embodiment is provided externally to the transmit/receive circuitry 10. A transmit path (or TX path) is shown by means of a dashed line 16 leading to the input/output connection pad 12. Signals for transmission via the antenna 14 pass along this path to the antenna in a manner to be described in further detail below. A receive path (or RX path) is shown by means of another dashed line 18 leading from the input/output connection pad 12. Signals which have been received by the antenna 14 pass along this path in a manner to be described in further detail below.

It will be apparent to the skilled reader that the TX path 16 and the RX path 18 are permanently coupled together at or around the antenna input/output connection pad 12. Thus, in contrast to the prior art, the TX and RX paths are connected regardless of whether the circuitry 10 is transmitting or receiving signals. This aspect will be described in further detail below.

The TX path 16 comprises a power amplifier 20. Differential outputs of the power amplifier 20 are coupled to opposite ends of a primary inductor L1, which is inductively coupled to a secondary inductor L2 to form a transformer 25. The transformer may be a step-up transformer, for example. The power amplifier 20 is supplied with power via a connection to a power supply 22 coupled to a tap of the primary inductor L1, and a connection to a pad 24 leading to a reference voltage, such as ground.

A variable capacitor C1 is connected in parallel with the primary inductor L1, between the differential outputs of the power amplifier 20. The operation of the variable capacitor C1 will be described in greater detail below.

One end of the secondary inductor L2 is coupled to the antenna input/output connection pad 12, while the other end is connected to a further connection pad 26 leading to a reference voltage, such as ground. In this way, the transformer 25 provided by the inductors L1 and L2 acts as a balun, converting the differential outputs of the power amplifier 20 to an unbalanced output leading to the antenna 14. A capacitor C2 is coupled in parallel with the secondary inductor L2, and this can be varied to allow the output frequency response of the power amplifier 20 to be tuned as desired.

Signals to be transmitted via the antenna 14 thus pass along the TX path 16 from the power amplifier 20, via the transformer 25, to the antenna input/output connection 12.

Signals are additionally received by the antenna 14 and provided to the input/output connection pad 12. The RX path 18 comprises a capacitor C3 which is coupled in series to the connection pad 12 such that DC components of the received signals are filtered out, or blocked. A first terminal of the capacitor C3 is thus connected to the antenna input/output connection pad 12, while a second terminal is connected to a resonant circuit comprising an inductor L3 and a capacitor C4, which are connected in parallel with each other. Thus, the second terminal of the DC-blocking capacitor C3 is coupled to respective first terminals of the inductor L3 and the capacitor C4. The respective second terminals of the inductor L3 and the capacitor C4 are coupled to an input of a low-noise amplifier (LNA) 28. The resonant circuit provided by the inductor L3 and the capacitor C4 thus acts to block frequencies within the received signals which are away from the resonant frequency of the circuit. This aspect will be described in greater detail below.

The LNA 28 receives signals which have been modified by action of the components in the RX path 18, and provides at an output (not illustrated) an amplified signal. The LNA 28 is supplied with power via a connection to a power supply 29, and a connection to a pad 30 leading to a reference voltage, such as ground. In order to decouple high-frequency noise in the power supply 29 from the LNA 28, a second path is provided from the power supply 29 to the pad 30, in parallel to the path containing the LNA 28. The second path comprises a capacitor C5 which, at high frequencies, has relatively low reactance. High-frequency noise in the power supply 29 thus passes preferentially down the second path, and is decoupled from the LNA 28.

The circuitry 10 further comprises a shorting path (labelled generally at 32), coupled between an input of the LNA 28 and a reference voltage, such as ground, which is operable to selectively short the LNA 28 to the reference voltage. Thus the shorting path 32 is connected at one end to an input of the LNA 28, and at the other end to the connection pad 30. A switch 34 is provided in the shorting path 32. When the switch 34 is closed, the shorting path 32 is completed such that the voltage at the input of the LNA is held at the reference voltage (e.g. ground). When the switch 34 is open, the shorting path 32 is broken and signals flow along the RX path 18 to the LNA 28.

The operation of the circuitry 10, according to embodiments of the invention, is as follows.

In a transmit mode, the switch 34 is closed, for example, under the control of an associated controller, logic circuitry or microprocessor. Input signals are amplified at the power amplifier 20 and output to the transformer 25. The signals experience gain, particularly at a frequency or a range of frequencies resulting from the resonance of the inductor L2 and the capacitor C2, and are provided to the antenna input/output connection pad 12.

The signals to be transmitted typically have a high voltage swing, which could damage the sensitive LNA 28. However, the circuitry 10 provides two independent mechanisms for mitigating this risk. First, the action of the inductor L3 is to oppose changes in voltage, such that the voltage at the input of the LNA 28 is greatly reduced compared to that at the antenna input/output connection pad 12. Second, the switch 34 is closed, such that input of the LNA 28 is held at, or close to, a reference voltage such as ground. In this way, the LNA 28 can be protected while the circuitry 10 is used to transmit signals.

In a receive mode, the switch 34 is open, for example, under the control of an associated controller, logic circuitry or microprocessor. The TX path 16 is inoperative in this mode, i.e. the power amplifier 20 is not used to transmit signals to be transmitted. The power amplifier 20 may therefore be disabled in receive mode, for example under the control of an associated controller, logic circuitry or microprocessor.

Signals are received at the antenna input/output connection pad 12, and any DC component is filtered by action of the capacitor C3. The resonant circuit provided by the inductor L3 and the capacitor C4 provides additional filtering at frequencies which are away from the resonant frequency of the resonant circuit, while providing passive gain at frequencies close to or at the resonant frequency of the resonant circuit. For example, the values of the inductance of the inductor L3 and the capacitance of the capacitor C4 may be chosen so as to result in a resonant frequency which is at or around the frequency of signals which are desired to be received at the antenna 14. In this way, components of the received signals having frequencies away from that of the desired signal (i.e. noise) are filtered out, while the desired signal experiences passive gain. In particular, frequencies which are higher than the frequency of the desired signals are filtered by action of the resonant circuit. Signals are then passed to the LNA 28, where they are amplified and provided to other circuitry for further processing, e.g. down-conversion and demodulation.

The circuitry 10 provides two separate sources of gain, to amplify signals received via the antenna 14 before they reach the LNA 28.

First, the resonant circuit provided by the inductor L3 and the capacitor C4 provides passive gain at and around the resonant frequency of the resonant circuit. Thus, by choosing the values of the inductance of the inductor L3 and the capacitance of the capacitor C4 so as to result in a resonant frequency which is at or around the frequency of signals which are desired to be received at the antenna 14, those signals preferentially experience gain.

Second, because the RX path 18 and the TX path 16 are permanently coupled together, signals received at the antenna 14 also interact with at least some of the components in the TX path 16. In particular, the inductor L3 can interact with one or more of the inductors L1 and L2 in the transformer 25 to provide a second gain mechanism. This second mechanism may apply gain preferentially at a different frequency to the resonant circuit described above, such that gain is provided by the circuitry 10 over a broader range of frequencies. For example, in one embodiment gain is provided by this second mechanism preferentially at a frequency is lower than the gain provided by the resonant circuit.

This mechanism can be further understood by analysis of the equivalent input impedance $Z_{IN}$ seen at the antenna input/output connection pad 12 due only to the presence of the transformer 25 and the capacitor C1. It can be shown that $Z_{IN}$ is equal to:

$$Z_{IN} = L_2 s - \frac{M^2 s^2}{L_1 s + \frac{1}{C_1 s}}$$

where $$s = 2\pi j f$$

where f is the frequency of the signal, where $L_1$ is the inductance of inductor L1, where $L_2$ is the inductance of inductor L2, where $C_1$ is the capacitance of variable capacitor C1, and where M is the mutual inductance of the transformer 25.

At low frequencies, by setting the value of $C_1$ appropriately, $Z_{IN}$ approximates to $L_2 s$, as the second term in the equation above becomes small compared to the first term. Thus, at low frequencies, the signals received at the antenna input/output connection pad 12 are affected only by the inductor L2 of the components in the TX path 16. The inductor L2 is inductively coupled with the inductor L3 (as they are both on the same chip), and together the two components form a step-up transformer. Thus the interaction of the inductor L3 with the inductor L2 of the TX path provides a further gain mechanism at frequencies lower than the gain provided by the resonant circuit alone.

Figure 2:
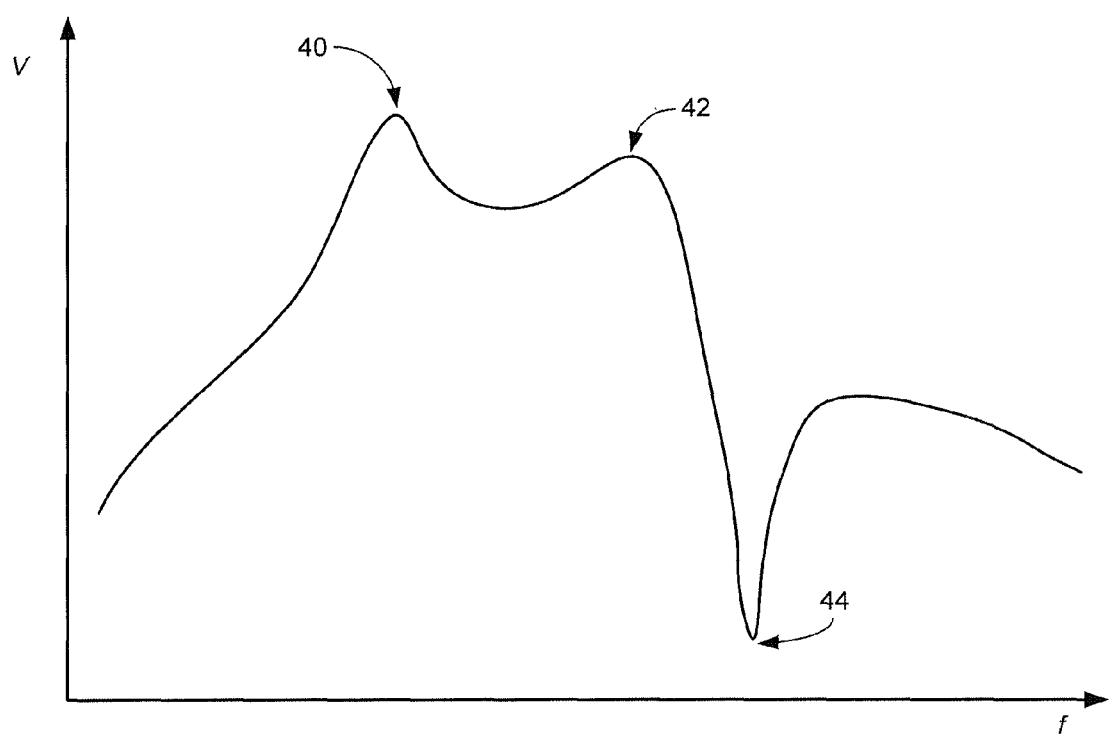
FIG. 2 shows an example of the frequency response of the circuitry shown in FIG. 1.

FIG. 2 is a graph showing schematically a plot of the frequency response of the circuitry 10 while in receive mode (i.e. with the switch 34 open).

The frequency response rises steadily with increasing frequency until reaching a first peak at reference numeral 40. The response drops slightly after this first peak 40, but rises again to a second peak 42 at a higher frequency. The second peak 42 is the result of the gain provided by the resonant circuit, i.e. inductor L3 and capacitor C4, while the first peak 40, at relatively lower frequency, is a result of the gain provided by the interaction of the inductor L3 with the inductor L2 in the transformer 25. Thus, the combination of these two gain mechanisms increases the frequency bandwidth over which signals can be effectively received by the circuitry 10.

After the second peak 42, the frequency response drops rapidly towards a notch 44 at higher frequency. Components of the received signal at or around the notch frequency are thus filtered from the signals which reach the LNA 28.

The notch 44 is also provided by action of components in the TX path 16. Specifically, the notch occurs when the equivalent input impedance $Z_{IN}$ seen at the antenna input/output connection pad 12 due only to the presence of the transformer 25 and the capacitor C1 is equal to zero. At this frequency, all the energy in the received signal passes down the TX path 16 and not the RX path 18. Thus, the notch frequency may be calculated by setting $Z_{IN}$ to zero in the equation given above:

$$Z_{IN} = 0 = L_2 s - \frac{M^2 s^2}{L_1 s + \frac{1}{C_1 s}}$$

$$L_1 s + \frac{1}{C_1 s} = \frac{M^2 s}{L_2}$$

$$s^2 = \frac{1}{C_1 (M^2 / L_2 - L_1)}$$

which can be solved to find the frequency using the equation for s above.

The capacitance $C_1$ can thus be chosen so as to achieve a particular notch frequency, filtering signals at a particular unwanted frequency.

The value of the capacitance $C_1$ thus affects both the notch frequency and the frequency at which gain occurs due to the interaction of the inductors L2 and L3. Those skilled in the art will appreciate that an appropriate value of $C_1$ can be chosen as desired by an operator of the circuitry 10 so as to achieve a given effect. For example, it may be the case that a source of noise is causing particular problems at a given frequency. In those circumstances, the value of $C_1$ may be chosen primarily so that the notch frequency coincides as far as possible to the frequency of the noise. In other circumstances, noise may not be such a problem, in which case $C_1$ can be chosen so as to maximise the bandwidth of the gain for received signals. In yet further circumstances, the value of $C_1$ may be chosen as a compromise, achieving gain over an acceptable bandwidth and a notch frequency which is sufficiently close to a known source of noise to suppress it. Of course, depending on the desired notch frequency, it may not be necessary to compromise at all, in which case an optimal bandwidth and an optimal notch frequency can be achieved with a single value of $C_1$.

The value of $C_1$ may be set once by a manufacturer of the circuitry 10, or by an operator so as to achieve a given notch frequency and a given bandwidth. In alternative embodiments, however, the value of $C_1$ may be altered dynamically so as to maximise the ability of the circuitry 10 to block unwanted sources of noise in changing conditions.

Figure 3:
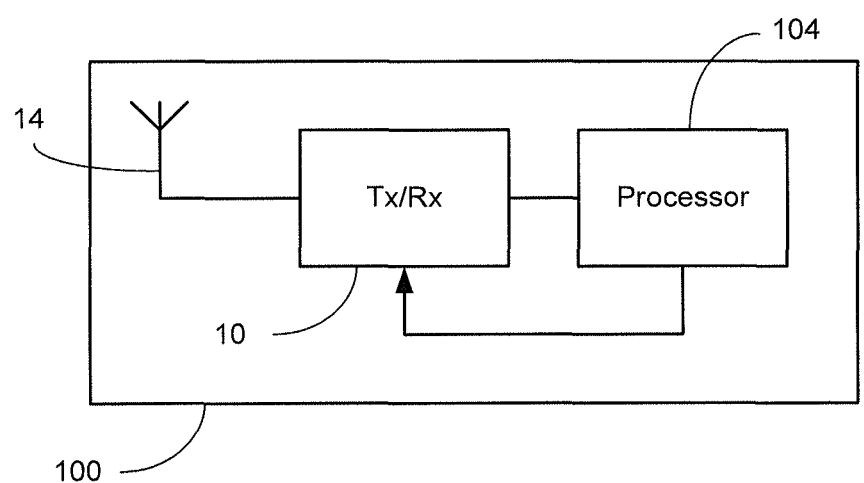
FIG. 3 shows a wireless communication device according to embodiments of the invention.

FIG. 3 shows an electronic wireless device 100 according to embodiments of the invention. The device comprises one or more antennas 14, which are coupled to a transmit/receive circuitry 10, as described above with respect to FIG. 1. In embodiments, the device 100 comprises a single antenna coupled to the circuitry. The device 100 further comprises a controller 104 coupled to the transmit/receive circuitry 10, which may be logic circuitry or a microprocessor, or any similar component capable of receiving signals and issuing control signals.

Those skilled in the art will appreciate that only those components necessary for an explanation of the invention are shown in the illustrations.

In operation, the device 100 transmits signals (which may be generated by the controller 104 or some other circuitry which is not illustrated), via the transmit/receive circuitry 10 and the antenna 102. The controller 104 issues a control signal to the circuitry 10, setting it to transmit mode and closing the switch 34.

When receiving signals, the controller 104 issues a control signal to the circuitry 10, setting it to receive mode and opening the switch 34 (and also potentially disabling the power amplifier 20). In embodiments, the controller 104 is configured to receive the signals which are received via the antenna 14 and the transmit/receive circuitry 10, and amplified by the LNA 28. The controller 104 may comprise analysis circuitry which analyses the frequency components of the received signal, and particularly determines whether there are significant components of the signal at frequencies other than the desired frequency (i.e. interfering frequencies). On the basis of that analysis, the controller 104 may issue one or more further control signals to the circuitry 10, so as to set the capacitance value $C_1$ of the capacitor C1 to a particular value so as to achieve a notch at the interfering frequency. In this way, the device 100 can adapt dynamically to new interferers in its vicinity, altering the value of the capacitance $C_1$ and, as a consequence, changing the notch frequency to match the interfering frequency such that the interferer is substantially suppressed.

The invention thus provides a transmit/receive circuitry and an electronic device comprising such circuitry, in which signals can be received over a wide band of frequencies. By integrating the receive and transmit paths on the same chip, with no off-chip switch to switch between them, the circuitry is made cheaper and smaller than existing solutions. Additionally, the transmit/receive circuitry has a notch for filtering out unwanted frequencies, the frequency of which may be varied so as to block (potentially dynamically) unwanted interferers.

Those skilled in the art will appreciate that various amendments and alterations can be made to the embodiments described above without departing from the scope of the invention as defined in the claims appended hereto.

The invention claimed is:

1. Transmit-receive circuitry for an electronic device capable of wireless communication, the transmit-receive circuitry comprising:
   an antenna input/output, for coupling to an antenna;
   a transmit path, coupled to the antenna input/output, the transmit path comprising:
      a power amplifier, for receiving transmission signals to be transmitted via the antenna; and
      a transformer; and
   a receive path, coupled to the antenna input/output, the receive path comprising:

a low noise amplifier, for receiving reception signals from the antenna; and
an inductor coupled in series with the low noise amplifier, the inductor applying a gain to the reception signals at a first frequency,
wherein, in a receive mode, the low noise amplifier is configured to receive the reception signals via the antenna input/output, and the transmit path is connected to the antenna input/output such that the reception signals experience gain as a result of the transformer in the transmit path.

2. The transmit-receive circuitry according to claim 1, wherein the receive path comprises a switch coupled between an input of the low noise amplifier and a reference voltage, and wherein the switch is configured to be open in the receive mode.

3. The transmit-receive circuitry according to claim 2, wherein the switch is configured to be closed in a transmit mode.

4. The transmit-receive circuitry according to claim 1, wherein the inductor is inductively coupled to the transformer, the inductive coupling between the inductor and the transformer resulting in a gain to the reception signals at a second frequency, different to the first frequency.

5. The transmit-receive circuitry according to claim 1, wherein the transmit path further comprises a capacitor connected in parallel with a primary coil of the transformer, such that the reception signals are subject to attenuation at a notch frequency.

6. The transmit-receive circuitry according to claim 5, wherein the capacitance of the capacitor is variable so as to vary the notch frequency.

7. Transmit-receive circuitry, comprising:
an antenna input/output, for coupling to an antenna;
a transmit path, coupled to the antenna input/output, the transmit path comprising:
a power amplifier, for receiving transmission signals to be transmitted via the antenna;
a transformer; and
a capacitor connected in parallel with a primary coil of the transformer; and
a receive path, coupled to the antenna input/output, the receive path comprising:
a low noise amplifier, for receiving reception signals from the antenna,
wherein, in a receive mode, the low noise amplifier is configured to receive reception signals via the antenna input/output, and the transmit path is connected to the antenna input/output such that the reception signals experience gain as a result of the transformer in the transmit path, and
wherein the capacitor of the transmit path causes attenuation of the reception signals at a notch frequency.

8. The transmit-receive circuitry according to claim 7, wherein the receive path comprises a switch coupled between an input of the low noise amplifier and a reference voltage, and wherein the switch is configured to be open in the receive mode and the switch is configured to be closed in a transmit mode.

9. The transmit-receive circuitry according to claim 7, wherein the receive path further comprises an inductor coupled in series with the low noise amplifier, the inductor applying a gain to the reception signals at a first frequency.

10. The transmit-receive circuitry according to claim 9, wherein the inductor is inductively coupled to the transformer, the inductive coupling between the inductor and the transformer resulting in a gain to the reception signals at a second frequency, different to the first frequency.

11. The transmit-receive circuitry according to claim 7, wherein the capacitance of the capacitor is variable so as to vary the notch frequency.

12. The transmit-receive circuitry according to claim 11, further comprising a controller configured to vary the capacitance of the variable capacitor such that the notch frequency corresponds to an interfering frequency.

13. The transmit-receive circuitry according to claim 12, wherein the controller is further configured to determine the interfering frequency from the reception signals.

14. Transmit-receive circuitry, comprising:
an antenna connection for coupling to an antenna;
a transformer having
a primary inductor, and
a secondary inductor having a first end coupled to the antenna connection and a second end coupled to a first reference voltage;
a power amplifier having a differential output coupled to the primary inductor of the transformer;
a low-noise amplifier having an input coupled to the antenna connection;
a resonant circuit coupled between the antenna connection and the input of the low-noise amplifier; and
a switch coupled between the input of the low-noise amplifier and a second reference voltage.

15. The transmit-receive circuitry according to claim 14, wherein the first reference voltage and the second reference voltage are a ground reference.

16. The transmit-receive circuitry according to claim 14, wherein the switch is configured to be open in a receive mode and the switch is configured to be closed in a transmit mode.

17. The transmit-receive circuitry according to claim 14, further comprising a capacitor coupled in parallel with the primary inductor.

18. The transmit-receive circuitry according to claim 17, wherein the capacitor coupled in parallel with the primary inductor of the transformer results in attenuation between the antenna connection and the input of the low-noise amplifier at a notch frequency.

19. The transmit-receive circuitry according to claim 18, wherein the capacitor coupled in parallel with the primary inductor of the transformer is a variable capacitor.

20. The transmit-receive circuitry according to claim 14, further comprising a capacitor coupled in parallel with the secondary inductor.

21. The transmit-receive circuitry according to claim 14, wherein the resonant circuit includes an inductor coupled in parallel with a capacitor.

22. The transmit-receive circuitry according to claim 21, wherein the inductor of the resonant circuit is inductively coupled to the transformer.

23. The transmit-receive circuitry according to claim 14, further comprising a capacitor [C3] coupled is series with the resonant circuit between the antenna connection and the input of the low-noise amplifier.

* * * * *